(12) United States Patent
Chen et al.

(10) Patent No.: US 8,005,288 B2
(45) Date of Patent: Aug. 23, 2011

(54) LAYER RECONSTRUCTION FROM DUAL-ENERGY IMAGE PAIRS

(75) Inventors: Yunqiang Chen, Plainsboro, NJ (US);
Tong Fang, Morganville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 770 days.

(21) Appl. No.: 12/101,487

(22) Filed: Apr. 11, 2008

(65) Prior Publication Data
US 2008/0267474 A1    Oct. 30, 2008

Related U.S. Application Data

(60) Provisional application No. 60/913,551, filed on Apr. 24, 2007.

(51) Int. Cl.
G06K 9/00 (2006.01)
G06K 9/36 (2006.01)
G06K 9/32 (2006.01)

(52) U.S. Cl. .......................... 382/132; 382/284; 382/294

(58) Field of Classification Search .................. 382/132, 382/284, 294
See application file for complete search history.

(56) References Cited

U.S. PATENT DOCUMENTS

| | | | |
|---|---|---|---|
| 6,754,298 B2* | 6/2004 | Fessler | 378/4 |
| 7,548,659 B2* | 6/2009 | Ofek et al. | 382/254 |
| 2006/0222266 A1* | 10/2006 | Lauze et al. | 382/299 |
| 2007/0133736 A1* | 6/2007 | Chen et al. | 378/5 |

OTHER PUBLICATIONS

Matsushita et al. "Full-Frame Video Stabilization with Video Inpainting" IEEE Transactions on Pattern Analysis and Machine Intelligence, Jul. 2006, vol. 28 No. 7, pp. 1150-1163.*

Bernard Sarel and Michal Irani, "Separating transparent layers of repetitive dynamic behaviors," in Proc. IEEE Int'l Conf. on Computer Vision, Washington, DC, USA, 2005, pp. 26-32.*

Gary J. Whitman, Loren T. Niklason, Meenakshi Pandit, L. Christine Oliver, Elisha H. Atkins, Olga Kinnard, Andrea H. Alexander, Michelle K. Weiss, Kavitha Sunku, Eric S. Schulze, and Reginald E. Greene, "Dual-energy digital subtraction chest radiography: technical considerations," Current Problems in Diagnnostic Radiology, vol. 31, No. 2, pp. 48-62.*

* cited by examiner

Primary Examiner — Brian Werner
Assistant Examiner — Utpal Shah (57) ABSTRACT

A system and method for layer reconstruction from dual-energy image pairs are provided, the method including: receiving a pair of dual-energy images, one having a relatively high energy dose and the other having a relatively low energy dose; ascertaining that a first relatively motionless layer is substantially aligned between the high and low dose images; computing a preliminary image of a second layer that has non-rigid motion relative to the first layer; detecting the relative motion of the second layer relative to the first layer; generating a mask in accordance with the detected motion; filling the motion area corresponding to the mask with gradients of the high-dose image; removing the first layer; and inpainting the motion area.

10 Claims, 11 Drawing Sheets

LAYER RECONSTRUCTION FROM DUAL-ENERGY IMAGE PAIRS

CROSS-REFERENCE TO RELATED APPLICATION

This application claims the benefit of U.S. Provisional Application Ser. No. 60/913,551, filed Apr. 24, 2007 and entitled "Inpainting-Based Soft Tissue Reconstruction From Dual-Energy Image Pairs", which is incorporated herein by reference in its entirety.

BACKGROUND

High-energy photons, such as X-rays, for example, can pass through objects before being significantly absorbed. Hence, high-energy photons are widely used to form images in security, medical imaging and industrial applications. Unlike normal reflection images, 3D objects are projected onto 2D images and appear semi-transparent in such high-energy images. In dual-energy X-ray imaging, two images are acquired by X-rays with relatively high-energy and relatively low energy spectra, respectively.

Images consisting of transparent layers are rarely addressed by conventional computer vision techniques. The transparency observed in emerging X-ray imaging devices in security, medical imaging and industrial inspection poses great challenges to existing algorithms.

Ongoing research attempts to address transparency in stereo estimation, image registration and layer separation. What is currently needed is a system and method for separating moving transparent layers in a dual-energy X-ray imaging scenario.

SUMMARY

The present disclosure addresses the above-described and other issues by providing a system and method for layer reconstruction from dual-energy image pairs. Exemplary embodiments are described.

An exemplary method for layer reconstruction from dual-energy image pairs is provided, the method comprising: receiving a pair of dual-energy images, one having a relatively high energy dose and the other having a relatively low energy dose; ascertaining that a first relatively motionless layer is substantially aligned between the high and low dose images; computing a preliminary image of a second layer that has non-rigid motion relative to the first layer; detecting the relative motion of the second layer relative to the first layer; generating a mask in accordance with the detected motion; filling the motion area corresponding to the mask with gradients of the high-dose image; removing the first layer; and inpainting the motion area.

An exemplary system for layer reconstruction from dual-energy image pairs is provided, the system comprising: a memory for receiving a pair of dual-energy images, one having a relatively high energy dose and the other having a relatively low energy dose; a gradient determination unit in signal communication with the memory for ascertaining that a first relatively motionless layer is substantially aligned between the high and low dose images, and computing a preliminary image of a second layer that has non-rigid motion relative to the first layer; a mask generation unit in signal communication with the memory for detecting the relative motion of the second layer relative to the first layer, and generating a mask in accordance with the detected motion; and a layer reconstruction unit in signal communication with the memory for filling the motion area corresponding to the mask with gradients of the high-dose image, removing the first layer, and inpainting the motion area.

An exemplary program storage device is provided, readable by computer, tangibly embodying a program of instructions executable by the computer to perform program steps for layer reconstruction from dual-energy image pairs, the program steps comprising: receiving a pair of dual-energy images, one having a relatively high energy dose and the other having a relatively low energy dose; ascertaining that a first relatively motionless layer is substantially aligned between the high and low dose images; computing a preliminary image of a second layer that has non-rigid motion relative to the first layer; detecting the relative motion of the second layer relative to the first layer; generating a mask in accordance with the detected motion; filling the motion area corresponding to the mask with gradients of the high-dose image; removing the first layer; and inpainting the motion area.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for layer reconstruction from dual-energy image pairs in accordance with the following exemplary figures, in which.

DETAILED DESCRIPTION OF PREFERRED EMBODIMENTS

The present disclosure provides a system and method for separating moving transparent layers in a dual-energy X-ray imaging scenario. The details of an exemplary separation algorithm are explained, and experiments on both synthetic data and real dual-energy medical images are provided. In addition, the system and method can be adapted to other types of dual-energy applications.

Figure 1:
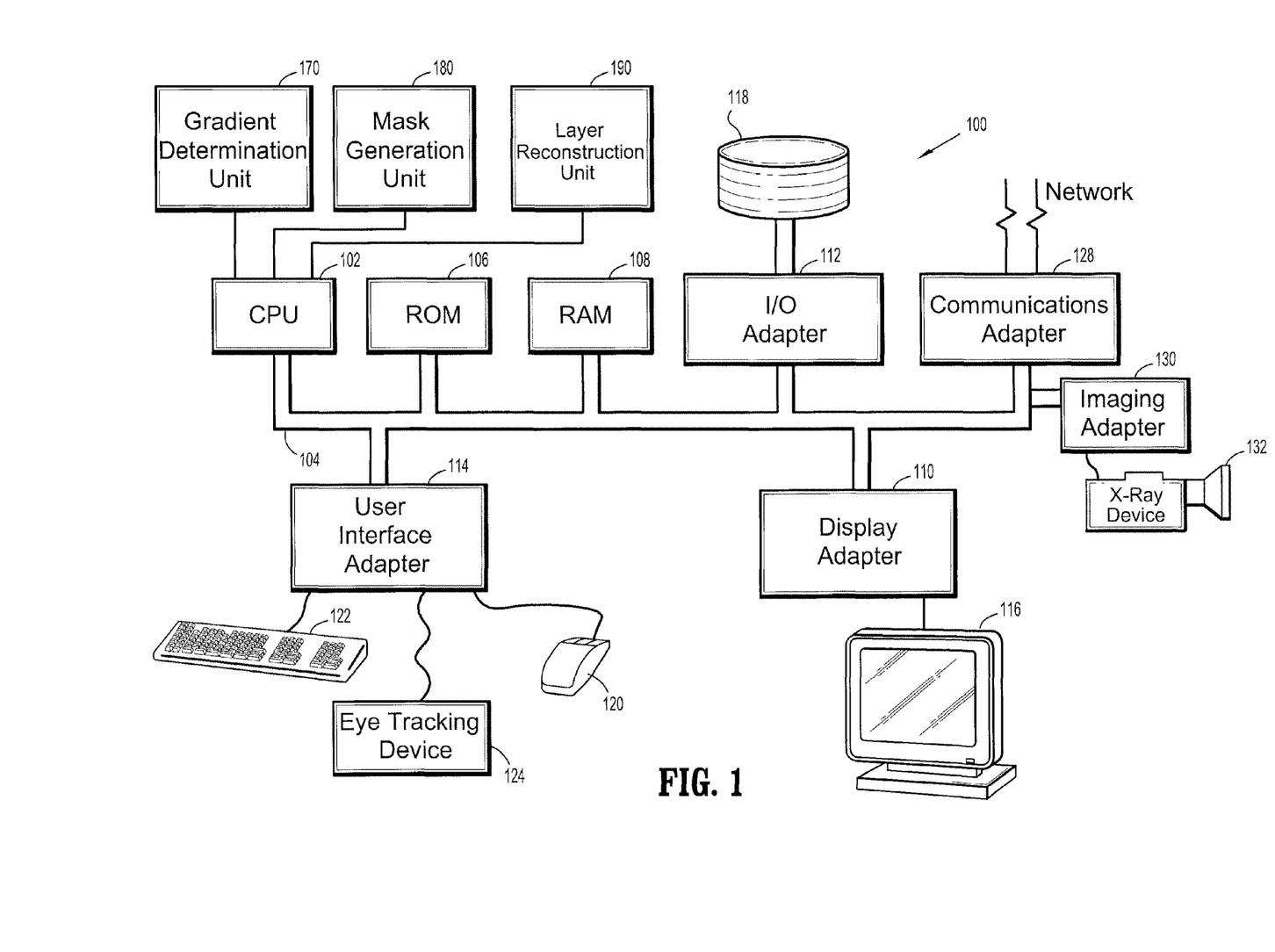
FIG. 1 shows a schematic diagram of a system for layer reconstruction from dual-energy image pairs in accordance with an illustrative embodiment of the present disclosure.

As shown in FIG. 1, a system for layer reconstruction from dual-energy image pairs, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A gradient determination unit 170, a mask generation unit 180 and a layer reconstruction unit 190 are also included in the system 100 and in signal communication with the CPU 102 and the system bus 104. While the gradient determination unit 170, the mask generation unit 180 and the layer reconstruction unit 190 are illustrated as coupled to the at least one processor or CPU 102, these components are preferably embodied in computer program code stored in at least one of the memories 106, 108 and 118, wherein the computer program code is executed by the CPU 102.

In alternate embodiments of the apparatus 100, some or all of the computer program code may be stored in registers located on the processor chip 102. In addition, various alternate configurations and implementations of the gradient determination unit 170, the mask generation unit 180 and the layer reconstruction unit 190 may be made, as well as of the other elements of the system 100.

In operation, an inpainting-based method is used to reconstruct soft tissue in a dual-energy image pair. The inpainting mask, i.e., the region with soft tissue motion, is generated by combining similarity and gradient information. If motion occurs, the matching score, which is a correlation of gradient maps, should be relatively low and the gradient of the subtracted image should be relatively high. A masked region is then filled with modified gradients. Finally, the masked region is inpainted by solving a Poisson equation. Experiments show excellent results.

Dual-energy X-ray imaging can be used to separate materials of different properties into different layers, such as bone and soft tissue, for example, to facilitate more detailed inspection. Unfortunately, motion during the acquisition of dual-energy images causes significant challenges to layer separation. The present disclosure provides a novel separation algorithm based on the sparse features in a gradient domain.

Instead of decomposing the image intensity values as taught by the prior art, embodiments of the present disclosure separate sparse gradient features to different layers and then reconstruct the layers based on the decomposed gradient fields, such as by solving a Poisson equation. In a preferred embodiment, a structure tensor based on directional quadrature filters is used to classify and separate the gradient field. Evaluation on both synthesized data and real datasets demonstrates the effectiveness of the algorithm and its robustness to complex non-rigid motion.

While the present disclosure focuses on separating moving transparent layers in a dual-energy X-ray medical imaging scenario, the algorithms presented herein can be extended to other types of dual-energy applications as well. High-energy photons, such as X-rays, can pass through objects before being substantially absorbed. Thus, such emissions are widely used in security, medical imaging and industrial applications. Unlike normal reflection images, projection images are formed from 3D objects that are projected onto 2D images, and which appear semi-transparent. In dual-energy X-ray imaging, two images are acquired with X-rays at relatively high and low-energy spectra. Due to different X-ray attenuation by each layer, such as bone versus soft tissue in a chest X-ray, it is possible to separate the different layers, thereby facilitating a more accurate inspection.

In chest imaging, the dual-energy images can be formulated as $I_1=aB+bS$ and $I_2=cB+dS$, as long as there is no motion during the acquisition of $I_1$ and $I_2$. Constants a, b, c and d reflect the attenuation coefficients of the bone (i.e., B) and soft tissue (i.e., S) to different X-ray spectra. The two layers (i.e., B and S) can then be individually reconstructed by weighted subtraction between $I_2$ and $I_2$.

Although some motion can be stopped, such as by holding breath to stop rib motion, other motion is inevitable, such as heart beating. For a more realistic model, we assume that one layer (e.g., bone) is static or its motion has been compensated, but that the other layer has a different motion relative to the first layer. The image formation model considering such motion is defined as set forth in Equation 1 of Table 1, where $T_S(\ )$ is the relative soft tissue motion after compensating for the bone motion. A simple weighted subtraction, as taught by the prior art, cannot handle this situation. Sarel and Irani propose a separation algorithm for repetitive dynamic behaviors based on a long sequence of images. Unfortunately, the algorithm of Sarel and Irani cannot be readily extended to dual-energy imaging where only two images are generally available.

The present disclosure provides a novel separation algorithm based on sparse features in a gradient domain. Instead of decomposing the intensity values, we decompose the gradient into different layers, and then different layers can be reconstructed from the separated gradient fields by solving the Poisson equation. Since gradient features are very sparse, the gradient $\nabla I_1$ is almost the same as the soft-tissue gradient for most of the pixels, except for the regions that have bone boundaries. Even along the bone boundaries, soft-tissue gradient and bone gradient usually have different orientations, hence allowing better decomposition. Since the bones do not move between $I_1$ and $I_2$, we can combine $\nabla I_1$ and $\nabla I_2$ to detect and separate the bone gradient from the soft-tissue gradient. Then each layer can be reconstructed from its gradient field. In this new scheme, there is no need to estimate the relative soft tissue motion $T_S(\ )$, which makes it very robust to complicated non-rigid tissue motion.

A layer separation algorithm is provided. The layer separation is based on gradient features. Unlike traditional images with opaque objects, X-ray images appear semi-transparent and each pixel consists of a weighted mixture of different layers. Moving layers cause great challenges to layer separation. In "Coupled Bayesian Framework for Dual-energy Image Registration", we solved jointly for registration and separation of transparent layers. However, that assumed the same motion on different layers. On the other hand, Sarel and Irani required a large number of images to handle repetitive motion, which cannot be readily extended to the present dual-energy imaging scenario.

One might think that weighted subtraction could be applied based on Equation 1 of Table 1 to cancel the bone layer. Unfortunately, then the soft-tissue would be overlaid with its moved version in the subtraction result, causing strong motion artifacts. Estimating the motion $T_S(\ )$ might reduce such motion artifacts. However, such estimation would itself be a very difficult task due to the low-contrast tissue, highly non-rigid motion, and the overlaid high-contrast bone structures.

To address these challenges, the present disclosure provides a novel algorithm to represent and separate the layers based on sparse gradient features, and then to reconstruct each layer from its gradient field. The basic considerations are as follows: 1) The gradient contains enough information, and each layer can be reconstructed from its gradient field. 2) The gradient is sparse and hence more separable. It is less likely that different layers have high contrast boundaries at the same location along the same direction. 3) Since the bone layer is already aligned, one should not need to estimate the complicated soft-tissue motion $T_S(\ )$ in order to separate different layers.

The resulting algorithm can be summarized as follows: First, try to separate bone gradient from soft-tissue gradient. Since $\nabla I_1 = a\nabla B + b\nabla S$, for regions that have no bone boundaries, one can obtain the soft-tissue gradient from one image, as $\nabla S = \nabla I_1 / b$. There is no need to align the soft-tissue layer between $I_1$ and $I_2$, which eliminates the soft-tissue motion estimation problem. For regions that have bone boundaries, the bone gradients are aligned between the dual-energy images according to Equation 1 of Table 1. Hence these regions can be detected by utilizing $\nabla I_1$ and $\nabla I_2$, and the bone gradient then can be canceled from $\nabla I_1$ to obtain a soft-tissue only gradient. After the gradient of the soft-tissue layer has been obtained, one can reconstruct the layer by solving the Poisson equation. The bone layer can then be obtained by subtraction between $I_1$ and the reconstructed soft-tissue layer.

Bone gradient classification using a structure tensor is now described. One needs to find the regions that have strong bone gradient and remove the bone gradient from $\nabla I_1$ to obtain the soft-tissue gradient. According to Equation 1 of Table 1, the bone gradient should appear on both $I_1$ and $I_2$ at the same location along the same orientation. Therefore, for regions that have bone boundaries, the gradients $\nabla I_1$ and $\nabla I_2$ have a ratio around a/c. For regions dominated by soft-tissue gradient, the ratio is around b/d if there is no soft-tissue motion, or the ratio would be quite arbitrary if the soft-tissue has moved. This provides an important cue to discriminate between bone and soft-tissue gradients. When combined with the structure tensor, one can detect the existence and estimate the orientation of bone boundaries.

Here, the structure tensor is a 2×2 matrix which can be estimated from a set of oriented quadrature filters as set forth in Equation 2 of Table 1, where $q_k$ is the output from quadrature filter k and $n_k$ is the orientation vector of that filter. I is the identity tensor and $\alpha$ is a constant depending on tensor dimension.

Since we want to detect the existence of bone gradient for further removal, we should determine if the quadrature filter output is from bone gradient, or not. If the oriented quadrature filter output on image $I_1$ (i.e., $q_{k,1}$) and image $I_2$ (i.e., $q_{k,2}$) have a given ratio (i.e., $q_{k,1}/(q_{k,1}+q_{k,2}) \approx a/(a+c)$), it indicates the filter output is mainly from bone gradient. Assuming the ratio is corrupted by Gaussian distributed noise, we can estimate the probability that the quadrature filter output belongs to bone boundaries as set forth in Equation 3 of Table 1, which represents a boniness measure.

Hence, the tensor defined in Equation 2 of Table 1 can be modified to represent the bone gradient tensor as set forth in Equation 4 of Table 1, which represents the bone tensor. We can compute the eigenvalues of the tensor matrix (i.e., $\lambda_1$ and $\lambda_2$). If there are bone boundaries in this neighborhood, the eigenvalues will be larger. So, we can detect the regions that contain bone boundaries by thresholding on $\lambda_1^2 + \lambda_2^2$ for further bone gradient removal.

In an alternate embodiment approach to canceling out bone gradients and obtaining the soft-tissue only gradients, one can detect the location and orientation of the bone gradients. Since bones are static or motion-compensated, their gradients are aligned between the dual-energy images. For the neighborhood that has bone gradients, one may be able to find like oriented strong gradients at the same location between the two dual-energy images. Assuming the soft-tissue gradient is not usually perfectly aligned with the bone gradient at the same location along the same orientation, the gradient magnitudes between the two images along the bone gradients will have a ratio of c/a according to Equation 1 of Table 1. This provides an important cue to classify the gradients to bone layer or soft-tissue layer. Gradient calculations are susceptible to imaging noise due to the high-pass filtering. Smoothness along the gradient direction provides good regularization on the classification results. To enforce smoothness along the gradient direction, a differently oriented filter bank may be applied to the two dual-energy images. The classification may be based on ratio, and a confidence measure may be based on the gradient magnitude.

Layer separation in a gradient domain is now discussed. For the regions that contain bone boundaries, it is possible that there are also soft-tissue gradients. We need to separate the bone gradient from the soft-tissue gradient. As described above, the structure tensor is used to detect the bone gradient. The structure tensor can also be used to estimate the bone gradient orientation. The bone boundary orientation can be calculated by $\theta = \arctan(2\ I_{12}/(I_{22} - I_{11} + C))$. To remove the bone gradient, we project the gradient vector (i.e., $\nabla I_1$) to the angle that is parallel to the bone boundaries (i.e., $n_\theta$). To summarize, the soft-tissue gradient calculation can be formulated as set forth in Equation 5 of Table 1.

Image layer reconstruction from a gradient field is presently addressed. Given the calculated gradient field of the soft-tissue layer, $G = \nabla S$, the next task is to reconstruct an image, $\hat{S}$, whose gradient field is closest to G. One natural way to achieve this is to solve the equation $\nabla \hat{S} = G$. Unfortunately, since the original gradient field is modified, the resulting gradient field is not necessarily integrable. Some part of the modified gradient may violate $\nabla \times G = 0$ (i.e., the curl of gradient is 0). In such a case, the task is to find a potential function $\hat{S}$, whose gradients are closest to G in the sense of least squares by searching the space of all 2D potential functions, that is, to minimize the integral set forth in Equation 6 of Table 1 in 2D space, where $F(\nabla \hat{S}, G) = \|\nabla \hat{S} - G\|^2$. According to the Variational Principle, a function F that minimizes the integral must satisfy the Euler-Lagrange equation as set forth in Equation 7 of Table 1. We can then derive a 2D Poisson equation as set forth in Equation 8 of Table 1, where $\nabla^2$ is the Laplacian operator, $\nabla^2 \hat{S}$ is equal to the sum of the second partial derivative of $\hat{S}$ with respect to x plus the second partial derivative of $\hat{S}$ with respect to y, and $\nabla \cdot G$ is the divergence of the vector field G, which is defined as $\nabla \cdot G$ equal to the sum of the first partial derivative of G with respect to x plus the first partial derivative of G with respect to y.

In order to solve the Poisson equation set forth in Equation 8 of Table 1, we use the Neumann boundary conditions $\nabla \hat{S} \cdot \acute{n} = 0$, where $\acute{n}$ is the normal on the boundary $\Omega$. In this case, the intensity gradients are approximated by a forward difference as set forth in Equation 9 of Table 1 and the Laplacian is represented as set forth in Equation 10 of Table 1. The divergence of the gradient is approximated as set forth in Equation 11 of Table 1. This results in a large system of linear equations. We use the 2D multigrid algorithm to iteratively find the optimal solution to minimize Equation 6 of Table 1.

Figure 2:
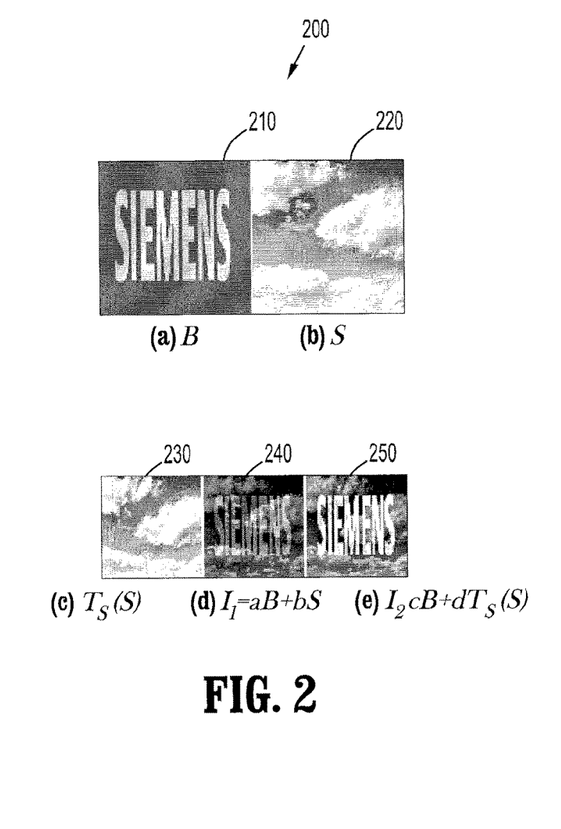
FIG. 2 shows a schematic diagram of synthetic experimental images illustrating first and second layers with a non-rigidly deformed second layer, and synthesized dual-energy images.

As shown in FIG. 2, synthesized images are indicated generally by the reference numeral 200. An algorithm embodiment of the present disclosure may be applied to both synthesized images and real dual-energy X-ray chest imaging datasets, for example. For the synthesized experiment, we select two images, a B image 210 and an S image 220, as shown in FIG. 2. B and S are the images used as bone and soft-tissue layers, respectively; a $T_S(S)$ image 230 is a non-rigidly deformed soft-tissue layer; and an $I_1$ image 240 and $I_2$ image 250 are synthesized dual-energy images.

B and S are mixed together based on the imaging model in Equation 1 of Table 1. Based on typical dual-energy imaging settings, we set a=1, b=1, c=3.2 and d=1.4. We assume that the bone layer is static and that the soft-tissue layer has been deformed by non-rigid motion $T_S(\ )$. The synthesized dual-energy images $I_1$ and $I_2$ are shown as well.

Figure 3:
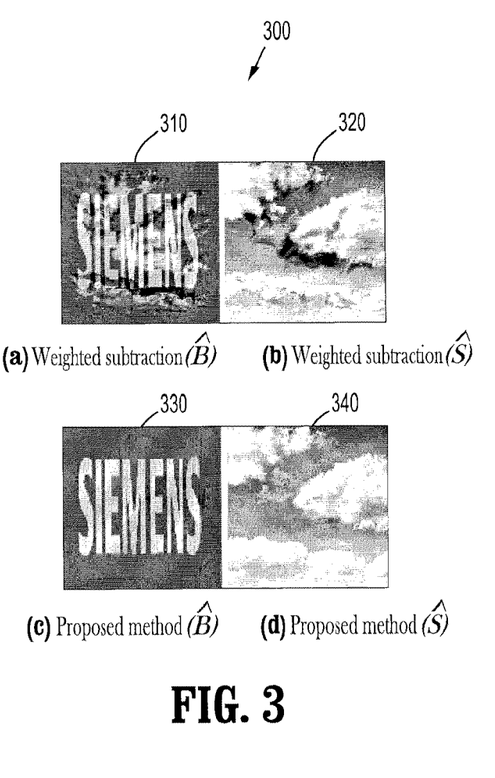
FIG. 3 shows a schematic diagram of comparative images for layer decomposition results with reconstructed bone and soft-tissue layers by both the weighted subtraction method and by layer reconstruction in accordance with an illustrative embodiment of the present disclosure.

Turning to FIG. 3, comparative images for layer decomposition results are indicated generally by the reference numeral 300. The weighted subtraction results are shown in the first row. A weighted subtraction for the bone layer 310, and a weighted subtraction for the soft-tissue layer 320 are shown. Here, we can see that the soft-tissue layer cannot be separated from the bone layer due to the motion. The reconstructed soft-tissue layer 320 does not contain any bone image since bone layer is static. However, it is corrupted by strong brighter and darker artifacts since it is an overlay of the true soft-tissue and the deformed soft-tissue (i.e., $\hat{S} = c \cdot b \cdot S - a \cdot d \cdot T_S(S)$). Without knowing the motion, it is almost impossible to obtain a clean soft-tissue layer by using the weighted subtraction method.

An algorithm according to the present disclosure works in the gradient domain. Gradient features are in higher dimension, represented by both location and orientation, and much sparser than intensities. It is much less likely for the bone gradient and soft-tissue gradient to happen at the same location along the same orientation. Hence gradient features can be better separated into different layers. By solving the Poisson equation, we can reconstruct the layers from the separated gradient fields. The reconstructed bone layer 330 and soft-tissue layer 340 are shown in FIG. 3. It can be seen that the two layers are well reconstructed compared with ground truth in FIG. 2, images 210 and 220. Some minor inaccuracies can be introduced when soft-tissue and bone layers have non-orthogonal gradients at some locations, which are more visible in homogeneous intensity regions in the bone layer. More refined or higher resolution gradient separation methods may further reduce any such perturbances. In addition, since the layers B and S are known, we can also estimate the error rate between the two methods.

Figure 4:
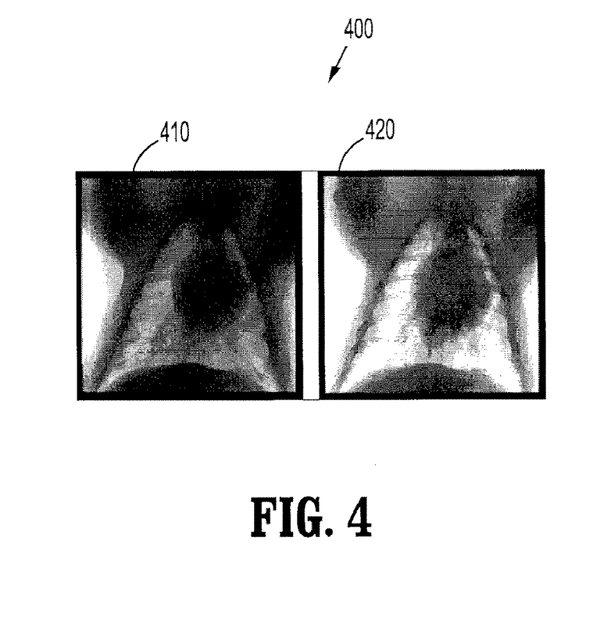
FIG. 4 shows a schematic diagram of experimental dual-energy input images for a hog chest.

Turning now to FIG. 4, experimental input dual-energy images of a hog chest are indicated generally by the reference numeral 400. Here, the input image 410 is the high-energy image $I_1$ and the input image 420 is the low-energy image $I_2$.

Figure 5:
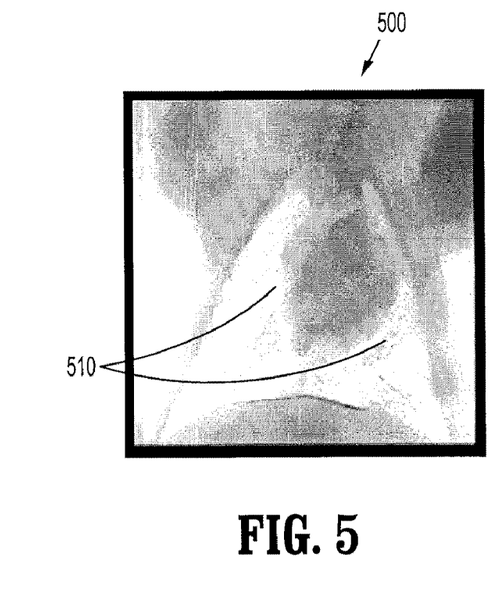
FIG. 5 shows a schematic diagram of a soft-tissue layer estimated by weighted subtraction.

As shown in FIG. 5, a soft-tissue layer estimated by weighted subtraction of the data from FIG. 4 is indicated generally by the reference numeral 500. Here, the reconstructed image layer shows significant artifact errors 510 at the borders of motion.

Figure 6:
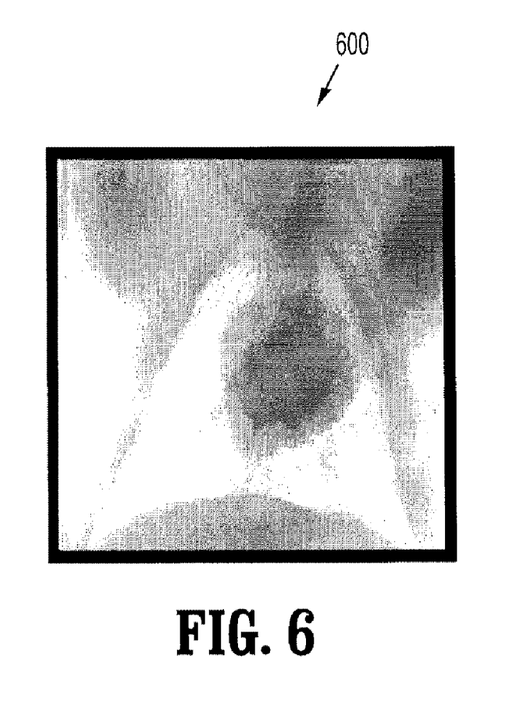
FIG. 6 shows a schematic diagram of a soft-tissue layer estimated by layer reconstruction in accordance with an illustrative embodiment of the present disclosure.

Turning to FIG. 6, a soft-tissue layer estimated by an algorithm according to the present disclosure, as applied to the data from FIG. 4, is indicated generally by the reference numeral 600. The present algorithm is applied to the real dual-energy datasets of FIG. 4. In comparison with the image 500 of FIG. 5, the reconstructed image layer 600 does not exhibit the errors 510.

Thus, weighted subtraction cannot reconstruct the soft-tissue layer correctly as shown in FIG. 5. We can clearly see the motion of the heart and the diaphragm, which causes the brighter and darker artifacts 510 around the moving boundaries. The low-contrast soft tissue structures attached to the heart were also destroyed by the motion artifacts in the weighted subtraction result.

On the other hand, the presently disclosed method achieves much better results as shown in FIG. 6. Here, the bone structures are fully canceled and the non-rigid motions of the soft-tissue are handled very well. No motion artifacts are generated along the boundaries of the heart and diaphragm. The low-contrast soft tissue structures around the heart are also well preserved despite their complicated motions.

Dual-energy imaging poses great challenges to algorithm development because of the complex non-rigid motion and the restricted number of acquired images. Embodiments of the present disclosure provide a novel transparent layer separation method to separate different layers. The new algorithm works on the sparse gradient features and does not need to estimate the complex soft-tissue motion. Hence, it is robust to very complex non-rigid soft-tissue motion. Experiments on both synthetic data and real X-ray datasets show that the provided algorithm achieves very good separation of the transparent layers despite the highly non-rigid motion.

An inpainting-based soft tissue reconstruction may be obtained from dual-energy image pairs. A dual-energy X-ray image pair is modeled as two linear combinations of soft tissue and bone data as set forth in Equation 1.1 of Table 2. Next, soft tissue and bone can be reconstructed using a difference as set forth in Equation 1.2 of Table 2.

Given e and f, the reconstruction is straightforward if the high-dose image H and the low-dose image L are perfectly aligned. In practice, this assumption is generally false due to motion like heart-beating and breathing, since H and L cannot be generated synchronously under normal conditions.

Figure 7:
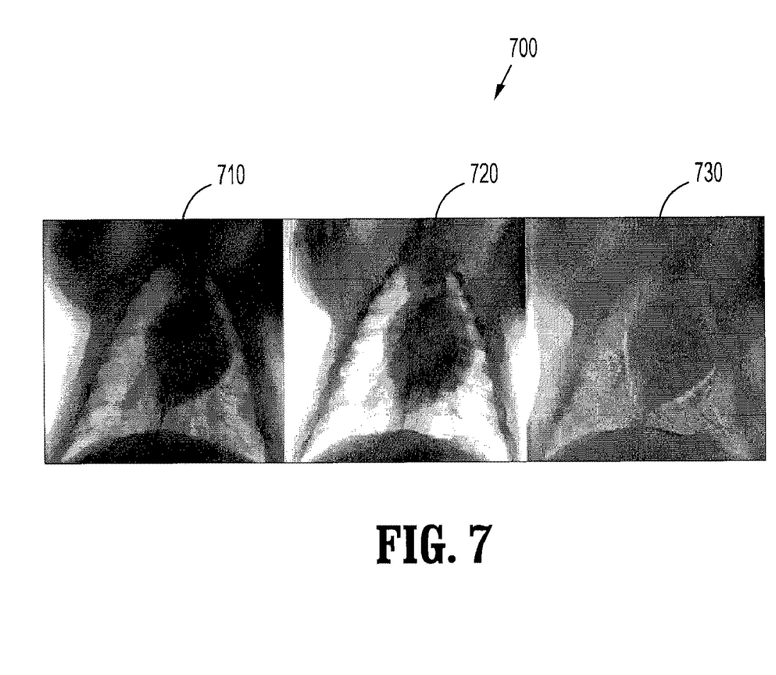
FIG. 7 shows a schematic diagram of a subtraction method that generates artifacts at the diaphragm and the boundary of the heart.

As shown in FIG. 7, a simple subtraction generates obvious artifacts at the diaphragm and the boundary of the heart. These three images are the high-dose image 710, the low-dose image 720 and the subtracted result 730, respectively, from left to right. Bones are already aligned so they are almost canceled in the result, and substantial artifacts only occur in the soft tissue.

Therefore, we turn to the weaker assumption that only bones are aligned. This weaker assumption is reasonable because we can register bones easier than soft tissue, which has motion that is highly non-rigid.

We provide a fast method to reconstruct soft tissues. First, a preliminary soft tissue image S is computed from Equation 1.2 of Table 2. Next, soft tissue motion is detected and a corresponding mask is generated. In the third step, we fill the motion area with gradients of high-dose image and remove the bone components. Finally, the motion area is inpainted by solving the Poisson equation, such as by using an efficient multigrid solver.

Since bones are already aligned and artifacts come primarily from soft tissue motion, we may detect the motion areas and reconstruct these areas using other information. If there were no motion, the local similarity between the two images would be quite high. We compute a normalized correlation cD between dH and dL, which are smoothed gradient magnitudes of H and L, respectively. Gradients are used instead of intensity in order to remove the influence of low-frequency components. However, the noise distributions of the two images are independent, so the correlation of some aligned areas might also be low. Another insight is that at motion locations, the gradient magnitude of the preliminary soft tissue image S must be high. These two criteria are combined to generate the final mask. If a pixel is not only close to a low-correlation (cD) region, but also near high gradient (in S) pixels, it is activated and needs further reconstruction. In practice, this is implemented by dilating thresholded cD and dS followed by a logical AND operation.

Figure 8:
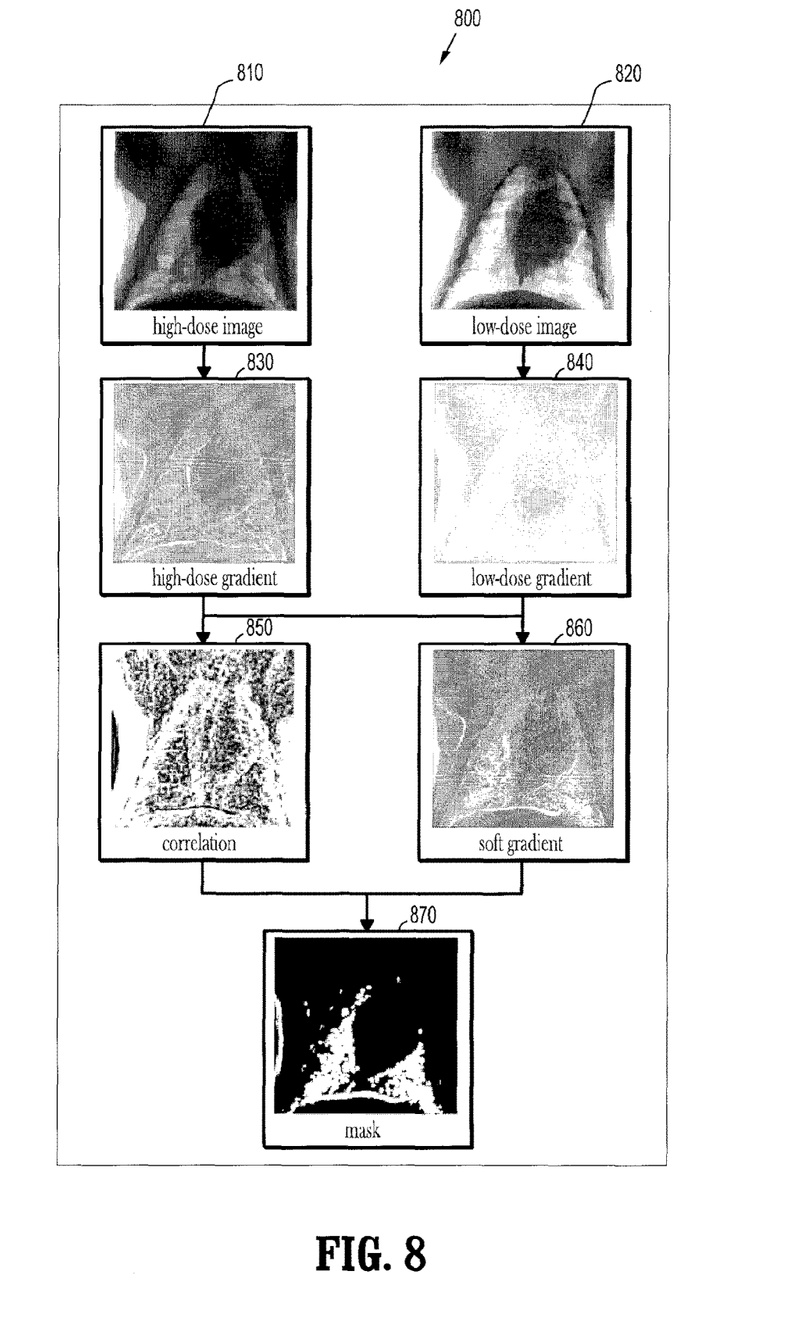
FIG. 8 shows a schematic flow diagram for mask generation, where the mask is determined by both correlation values and gradient magnitudes in accordance with an illustrative embodiment of the present disclosure.

Turning to FIG. 8, a flowchart for mask generation is indicated generally by the reference numeral 800. Here, a high-dose image is received at step 810 and a low-dose image is received at step 820. A high-dose gradient is computed from the high-dose image at step 830, and a low-dose gradient is computed from the low-dose image at step 840. Next, a correlation is computed between the high and low-dose gradients at step 850, and a soft gradient is computed from the high and low-dose gradients at step 860. Finally, a mask is determined by both correlation values and gradient magnitudes at step 870.

For gradient modification, we use the gradient of H without pre-smoothing to guide inpainting since bones are weaker in H. More particularly, we want to assign the divergence of $\nabla H$ to the right-hand side of the Poisson equation. However, this won't work well for the following reasons: First, the preliminary soft tissue image S and high-dose image H are not consistent in scale, so we cannot copy S to the non-masked region while reconstructing from $\nabla H$ within the mask. The second part of Equation 1.2 indicates that for soft tissue, Equation 3.1 of Table 2 applies. Combining Equation 3.1 with the first part of Equation 1.2, one can see the scale difference between $\nabla H$ and $\nabla S$, as set forth in Equation 3.2 of Table 2.

Thus, $\nabla H$ is to be multiplied by (c−f) to match the non-masked area. Another issue is that $\nabla H$ is still contaminated by bone gradients although the bone component is weak; otherwise one might just pick H as output. To detect bone gradient, we use the fact that in bone area, $\nabla S$ is significantly smaller than $\nabla H$ and $\nabla L$ across bone edges. So the following boniness measure is computed within the mask as set forth in Equation 3.3 of Table 2, where $\nabla h$ denotes a gradient value along the primary gradient direction, which is across bone edges in most bone areas, and c prevents singular division. In practice, we get $\nabla hH$ and $\nabla hL$ by filtering the image with a bank of multi-directional anisotropic DoG filters and picking the maximal response. $\nabla hS$ is obtained by weighted subtraction according to Equation 1.2 of Table 2.

An anisotropic DoG filter bank is robust to noise without losing location accuracy, so it is much more desirable than an isotropic DoG filter bank. After bone detection we remove the bone gradient component in $\nabla H$. One possible way is by projecting the gradient along bone edges so that the component across them is removed. But sometimes such projection introduces a new source of error as soft tissue boundaries overlap with bone boundaries, and they are not perpendicular. Another alternative is replacing the gradient component across bone edges with the corresponding component of $\nabla S$. This might cause other trouble though, such as when the soft tissue under the bone has motion along the bone boundary. Fortunately, the above error-prone cases are quite rare and only slightly affect the final reconstruction result.

Figure 9:
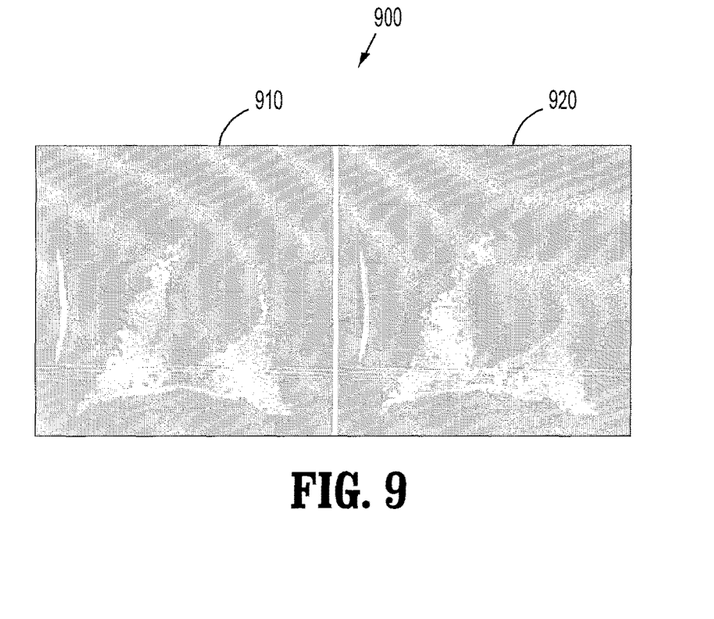
FIG. 9 shows a schematic diagram of gradient modification in accordance with an illustrative embodiment method of the present disclosure.

Turning now to FIG. 9, an example of gradient modification is indicated generally by the reference numeral 900. This example is actually quite challenging due to strong soft tissue texture under bones, where an isotropic DoG filter bank works poorly. In FIG. 9, the left image 910 shows a scaled gradient of H inside the mask. The right image 920 presents a gradient after removing bone gradients. For clarity, only the y-component gradient is displayed. Note that bone gradients are mostly removed while gradients along the diaphragm are preserved.

Inpainting may be applied in a masked region. From the modified gradients inside the mask and the nearly perfect subtracted intensities outside, we setup a Poisson equation where the right-hand side is the divergence of the modified gradients as set forth in Equation 4.1 of Table 2. We use a multigrid framework to solve this equation efficiently.

Experimental results were also obtained for inpainting. We have tested our algorithm on several X-ray image pairs. The results are shown in FIGS. 10, 11, 12 and 13.

Figure 10:
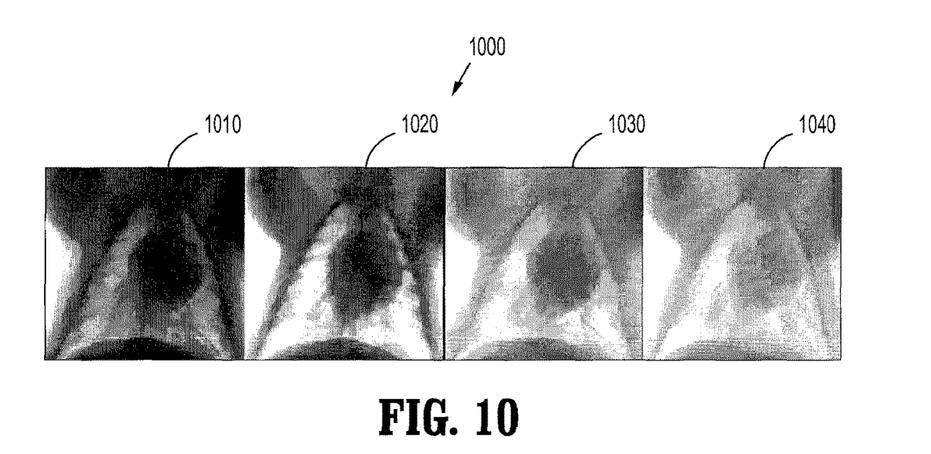
FIG. 10 shows a schematic diagram comparing an illustrative embodiment of the present disclosure with an anisotropic scaling example.

As shown in FIG. 10, an experimental results example is indicated generally by the reference numeral 1000. 1010 is the high-dose image, 1020 the low-dose, 1030 is our result using an embodiment of the present disclosure, and 1040 is the old scaling result. Here, we made a comparison with the old anisotropic gradient scaling method, i.e. suppressing the y-component of gradient while preserving the x-component, which is sometimes not reasonable in practice. Note that the anisotropic scaling of the prior method blurs many features, including the boundary of heart and diaphragm.

Figure 11:
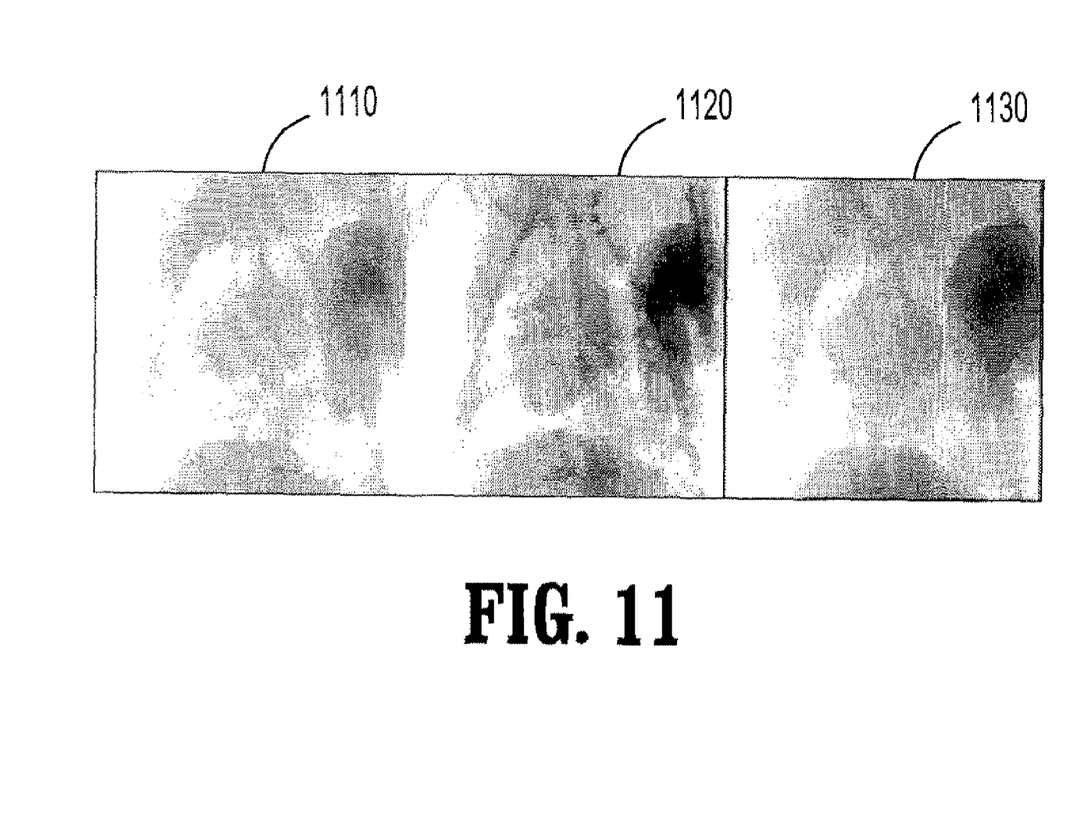
FIG. 11 shows a schematic diagram of another example.

Turning to FIG. 11, another experimental results example is indicated generally by the reference numeral 1100. Here, 1110 is the high-dose image, 1120 the low-dose, 1130 is our result using an embodiment of the present disclosure.

Figure 12:
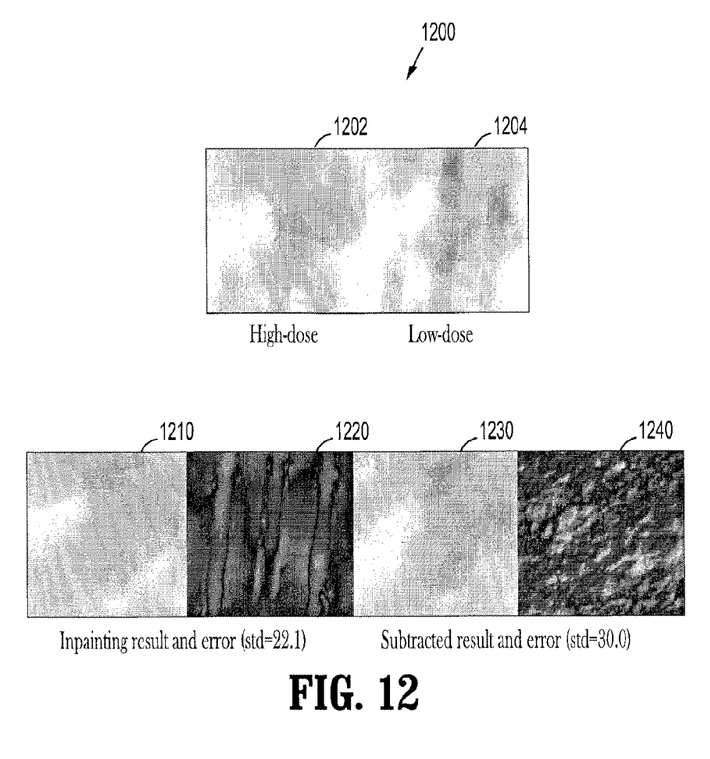
FIG. 12 shows a schematic diagram of a synthesized example with single motion.

Turning now to FIG. 12, a synthesized example with single motion is indicated generally by the reference numeral 1200. Here, 1202 and 1204 are the high-dose and low-dose images, respectively; the inpainting result is 1210, on the left; the inpainting error is 1220, second from left, with a standard deviation of 22.1; the subtracted result is 1230, third from left; and the subtracted error is 1240, on the right, with a standard deviation of 30.0.

Figure 13:
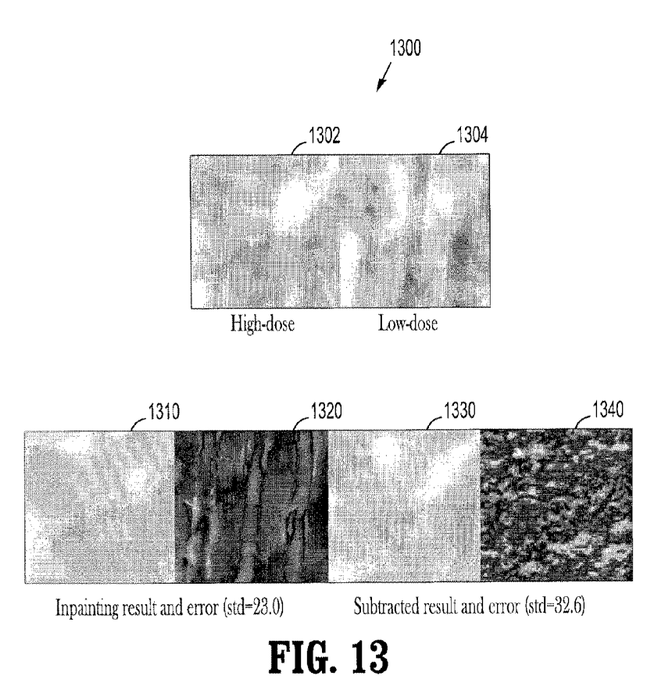
FIG. 13 shows a schematic diagram of a synthesized example with multiple motion.

Turning now to FIG. 13, a synthesized example with multiple motion is indicated generally by the reference numeral 1300. Here, 1302 and 1304 are the high-dose and low-dose images, respectively; the inpainting result is 1310, on the left; the inpainting error is 1320, second from left, with a standard deviation of 23.0; the subtracted result is 1330, third from left; and the subtracted error is 1340, on the right, with a standard deviation of 32.6.

Figure 14:
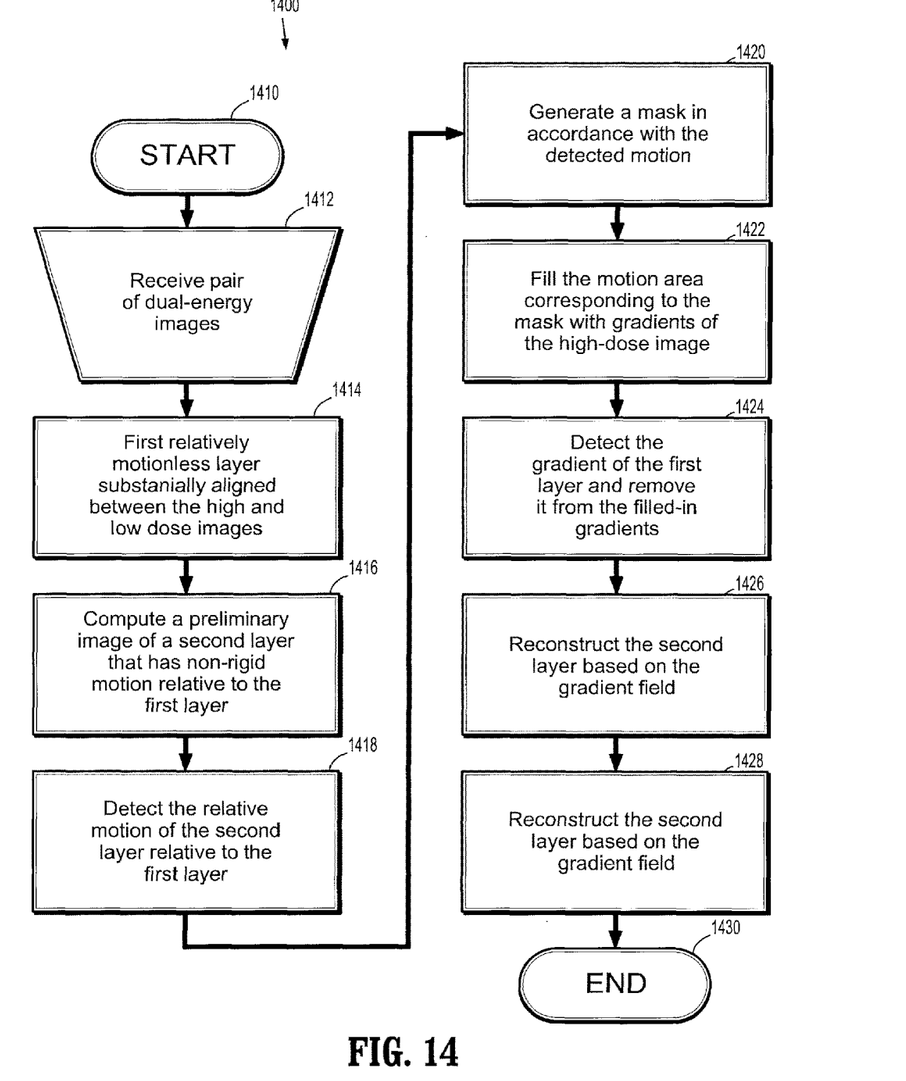
FIG. 14 shows a schematic flow diagram for layer reconstruction from dual-energy image pairs in accordance with an illustrative embodiment of the present disclosure.

As shown in FIG. 14, a flowchart for a method of layer reconstruction from dual-energy image pairs is indicated generally by the reference numeral 1400. A start block 1410 passes control to an input block 1412. The input block 1412 receives a pair of dual-energy images, one having a relatively high-energy dose and the other having a relatively low energy dose, and passes control to a function block 1414. The function block 1414 ascertains that a first relatively motionless layer is substantially aligned between the high and low dose images, and passes control to a function block 1416. The function block 1416, in turn, computes a preliminary image of a second layer that has non-rigid motion relative to the first layer, and passes control to a function block 1418. The function block 1418 detects the relative motion of the second layer relative to the first layer, and passes control to a function block 1420.

The function block 1420 generates a mask in accordance with the detected motion, and passes control to a function block 1422. The function block 1422, in turn, fills the motion area corresponding to the mask with gradients of the high-dose image, and passes control to a function block 1424. The function block 1424 detects the gradient belonging to the first layer, such as the bone gradient, and removes it from the filled-in gradients, that is the gradients filled into the motion area in block 1422, and passes control to a function block 1426. The function block 1426, in turn, reconstructs the second layer based on the gradient field, such as by inpainting the motion area, and passes control to a function block 1428. The function block 1428 reconstructs the first layer by subtracting the reconstructed second layer from the high energy image, and passes control to an end block 1430.

Thus, both the first or bone layer and the second or soft-tissue layer are reconstructed. This is accomplished by reconstructing the second or soft-tissue layer first, and then obtaining the first or bone layer by subtracting the reconstructed second layer from the high energy image.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as additional imaging units, data storage units and/or printing units.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

TABLE 1

$$I_1 = a \cdot B + b \cdot S \quad (1)$$
$$I_2 = c \cdot B + d \cdot T_S(S)$$

$$T = \sum_k \|q_k\| (n_k n_k^T - \alpha I) \quad (2)$$

$$P_{B,k} = \frac{1}{\sigma\sqrt{2\pi}} e^{-\left(\frac{q_{k,1}}{q_{k,1}+q_{k,2}} - \frac{\alpha}{(\alpha+c)}\right)^2 / (2\sigma^2)} \quad (3)$$

$$T = \sum_k P_{B,k} \cdot \|q_{k,1}\| (n_k n_k^T - \alpha I) \quad (4)$$

$$\nabla S = \begin{cases} \nabla I_1, & \text{if } \lambda_1^2 + \lambda_2^2 < C_{thres} \\ (\nabla I_1, n_\theta) \cdot n_\theta, & \text{if } \lambda_1^2 + \lambda_2^2 \geq C_{thres} \end{cases} \quad (5)$$

$$f = \min \int \int F(\nabla \hat{S}, G) dx dy \quad (6)$$

$$\frac{\partial F}{\partial \hat{S}} - \frac{d}{dx}\frac{\partial F}{\partial \hat{S}_x} - \frac{d}{dy}\frac{\partial F}{\partial \hat{S}_y} = 0 \quad (7)$$

$$\nabla^2 \hat{S} = \nabla \cdot G \quad (8)$$
$$\nabla \hat{S} = [\hat{S}(x+1, y) - \hat{S}(x, y), \hat{S}(x, y+1) - \hat{S}(x, y)]^T \quad (9)$$
$$\nabla^2 \hat{S} = -4\hat{S}(x, y) + \hat{S}(x-1, y) + \hat{S}(x+1, y) + \hat{S}(x, y+1)] \quad (10)$$
$$\nabla \cdot G = G_x(x, y) - G_x(x-1, y) + G_y(x, y) - G_y(x, y-1) \quad (11)$$

TABLE 2

$$\begin{cases} H(x, y) = a\overline{S}(x, y) + b\overline{B}(x, y) \\ L(x, y) = c\overline{S}(x, y) + b\overline{B}(x, y) \end{cases} \quad (1.1)$$

$$\begin{cases} S(x, y) = \lambda \overline{S}(x, y) = eH(x, y) - L(x, y) \\ B(x, y) = \eta \overline{B}(x, y) = fH(x, y) - L(x, y) \end{cases} \quad (1.2)$$

$$f\nabla H - \nabla L = 0 \quad (3.1)$$
$$\nabla S = e\nabla H - \nabla L - (e - f)\nabla H \quad (3.2)$$

$$b(x, y) = \frac{\nabla_b H^2 \nabla_b L^2}{\nabla_b S^2 + \varepsilon} \quad (3.3)$$

$$\frac{\partial^2 I(x, y)}{\partial x^2} + \frac{\partial^2 I(x, y)}{\partial y^2} = \nabla \cdot \nabla H \quad (4.1)$$

What is claimed is:

1. A method for layer reconstruction from dual-energy image pairs, the method comprising:
   receiving a pair of images including a first image captured at a relatively high-energy dose and a second image captured at a relatively low energy dose;
   determining gradients aligned between the pair of images as a first layer;
   determining a second layer by subtracting the first layer from a gradient of the first image;
   detecting a motion area of the second layer relative to the first layer;
   inpainting the motion area of the second layer with gradients of the first image; and
   reconstructing the second layer by removing the gradients of the first layer from the gradients of the first image inpainted in the motion area of the second layer, wherein the second layer is an image of soft tissue.

2. The method of claim 1 wherein detecting the motion area of the second layer relative to the first layer comprises determining a normalized correlation between the gradient of the first image and a gradient of the second image, respectively.

3. The method of claim 1 further comprising generating a mask in accordance with the motion area, wherein generating the mask comprises:

determining regions of relative correlation between the pair of images;

determining areas where a gradient of the second layer is high; and activating at least one pixel of the mask that is both close to a low-correlation region and near a high-gradient region.

4. The method of claim 1 further comprising generating a mask in accordance with the motion area, wherein generating the mask comprises:

correlating the gradient of the first image with gradient of the second image;

determining a gradient of the second layer corresponding to a non-correlation between a scaled version of the gradient of the first image and the gradient of the second image;

determining the mask in accordance with the correlation and the gradient of the second layer.

5. The method of claim 1 further comprising reconstructing the first layer by removing the gradients of a reconstructed second layer from the gradients of the first image, wherein the second layer is an image of bone.

6. A non-transitory program storage device readable by computer, tangibly embodying a program of instructions executable by the computer to perform program steps for layer reconstruction from dual-energy image pairs, the program steps comprising:

receiving a pair of images including a first image captured at a relatively high-energy dose and a second image captured at a relatively low energy dose;

determining gradients aligned between the pair of images as a first layer;

determining a second layer by subtracting the first layer from a gradient of the first image;

detecting a motion area of the second layer relative to the first layer;

inpainting the motion area of the second layer with gradients of the first image; and reconstructing the second layer by removing the gradients of the first layer from the gradients of the first image inpainted in the motion area of the second layer.

7. The device of claim 6 wherein detecting the motion area of the second layer relative to the first layer comprises determining a normalized correlation between the gradient of the first image and a gradient of the second image, respectively.

8. The device of claim 6 further comprising generating a mask in accordance with the motion area, wherein generating the mask comprises:

determining regions of relative correlation between the pair of images;

determining areas where a gradient of the second layer is high; and activating at least one pixel of the mask that is both close to a low-correlation region and near a high-gradient region.

9. The device of claim 6 further comprising generating a mask in accordance with the motion area, wherein generating the mask comprises:

correlating the gradient of the first image with a gradient of the second image;

determining a gradient of the second layer corresponding to a non-correlation between a scaled version of the gradient of the first image and the gradient of the second image;

determining the mask in accordance with the correlation and the gradient of the second layer.

10. The method of claim 6 further comprising reconstructing the first layer by removing the gradients of a reconstructed second layer from the gradients of the first image.

* * * * *